United States Patent Office 3,290,562
Patented Dec. 6, 1966

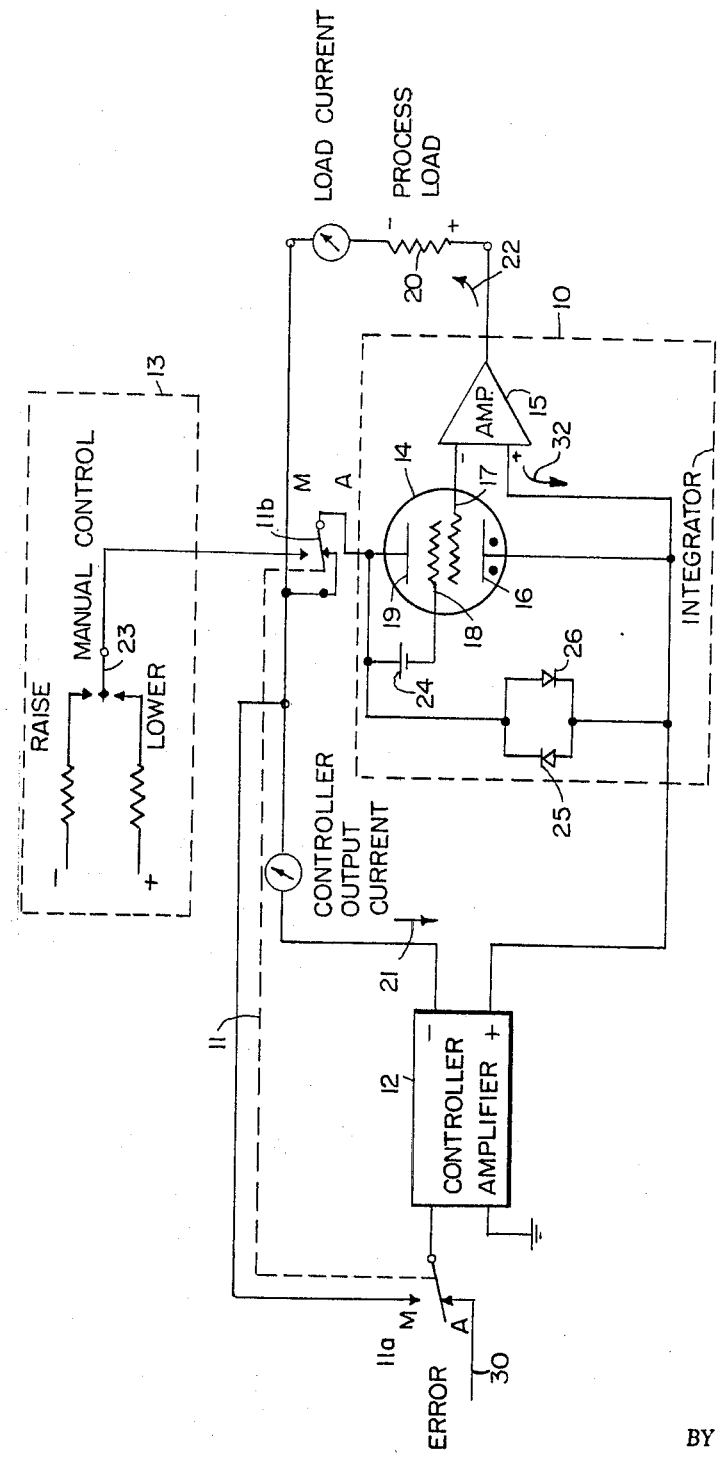

3,290,562
SELF-SYNCHRONIZED CONTROLLER FOR "BUMP-LESS" TRANSFER BETWEEN MANUAL AND AUTOMATIC MODES
Leroy M. Faulkner, Boxford, Mass., and Clarence W. Hewlett, Jr., Hampton, N.H., assignors to General Electric Company, a corporation of New York
Filed Dec. 10, 1963, Ser. No. 329,419
9 Claims. (Cl. 317—231)

This invention relates to process controllers, and more particularly to process controllers of the type which permit both automatic and manual control of a process load.

Provisions must be made with this type of controller to prevent a disruption or "bump" in the process load current when the controller is transferred between its automatic and its manual modes of operation. One prior art technique for preventing such a disruption during transfer makes use of a manual balance position which is interposed between the manual and the automatic positions of the control switch. In accordance with this technique, provisions are made for manually adjusting the magnitude of the manual control signal when the transfer switch is in this manual balance position so as to prevent a disruption during a transfer from the automatic to the manual mode of operation. Bumpless transfer is accomplished by bringing the manually adjusted control signal to a value equal to the value of the automatic control signal before the manual control signal is connected to control the process load.

Systems that rely upon the performance of this manual balance function have been found to be not completely satisfactory when speed and accuracy of transfer is essential since these requirements are limited by the speed and accuracy with which the operator can perform the manual balance operation. Manual balancing is thus not suitable for use in applications where there is a need for automatic and instantaneous transfer of the controller from one mode of operation to the other without introducing an undesirable bump in the process load. One common example of such an application is found in computer controlled installations wherein it is desired to make the transfer for start-up or shut-down operations or for safety reasons arising from diagnostic checks of the system performance.

These types of requirements have led to the development of systems for self-synchronizing manual/automatic controllers which utilize electromechanical servo systems for causing the manual control signal to follow the automatic control signal at all times thus permitting automatic transfer at any time. This is quite commonly accomplished by driving with a reversible motor a potentiometer which provides the manual control signal. Even though these types of systems have the advantage of not requiring manual balancing during transfer, they have generally been found to be bulky, expensive and unreliable because of the presence of electromechanical components.

It is therefore an object of this invention to provide a compact, inexpensive and reliable system for self-synchronizing a manual/automatic controller.

It is another object of this invention to provide a system for self-synchronizing a manual/automatic controller which utilizes a servo system having no movable components.

These and other objects and advantages of the invention may best be understood by reference to the following description taken in conjunction with the accompanying drawing in which the figure is a schematic representation of the preferred embodiment of this invention.

In accordance with this invention, a self-synchronizing system having no movable components is provided by utilizing an integrating device capable of being electrically read out in cooperation with a controller, a manual signal source, and a manual/automatic mode-transfer switch to control the current flowing in the process load. Control of the process load current is accomplished by coupling the output circuit of the integrating device to the process load while controlling the current applied to the input of the integrating device. The output of the controller is coupled to the process load in a manner such that a difference current will be generated in a circuit connected in parallel with the output of the controller, the difference current being equal to the difference between the current flowing in the process load and the controller output current. Provisions have been made to selectively apply this difference current to either the input of the controller or the input of the integrating device by utilizing the manual/automatic switch to connect the inputs in parallel with the output of the controller.

Provisions are also made for securing manual control by connecting the manual control signal source to the input of the integrating device, while the difference current is applied to the input of the controller amplifier in a manner such that the output of the controller is made to follow the process load current.

Automatic control is obtained when the transfer switch is operated to connect the error signal; i.e., the signal equal to the difference between the measured variable and the set point voltage, to the input of the controller while the difference current is applied to the input of the integrating device so as to cause the output current of the integrating device to follow the output current of the controller. It can thus be seen that, in accordance with this invention, whenever the controller is switched from one mode of operation to the other, the transfer will be accomplished without a bump in the process load current since the process load remains connected to the integrating device during transfer and the signal readout of the integrating device does not change when the input signal is removed as occurs when a transfer is made. The process load current will thus be maintained at whatever level it had assumed at the time of the operation of the transfer switch due to its storage function.

Referring now to the drawing, we have illustrated the basic form of the invention in which electrical read-out integrator 10 cooperates with manual/automatic transfer switch 11, controller amplifier 12, and manual control source 13 to provide means for self-synchronizing a controller to accomplish bumpless transfers between manual and automatic control. Integrator 10 is comprised of solion 14 and amplifier 15 which are interconnected so that the output of the solion is connected to the input of amplifier 15.

Solions which are recognized as being capable of functioning as an electrical read-out integrator are four electrode electrochemical cells which contain an electrolyte for permitting the passage of a current to be integrated between an input electrode and a common electrode. The electrolytic solution utilized is a solution of a reversible redox system; i.e., a system in which the ionic conduction between two electrodes results in the reduction of one species of the ions in solution at one of the electrodes and the corresponding oxidation of the other species of the ion at the other electrode of the system so that there is no net change in contents of the cell.

When solions are utilized as a current integrating device as described and claimed in the application of Clarence W. Hewlett, Jr., Serial No. 323,795, "System for Sampling and Storing Information" filed November 14, 1963, and assigned to the same assignee as the present invention, the passage of current between the input and common electrodes changes the quantity of the measured species in what has been termed the integral compartment.

The read-out electrode, which is located in the integral compartment along with the common electrode, is utilized to indicate the concentration of the measured species in the integral compartment by permitting the passage of the read-out current between the read-out and common electrodes. The magnitude of the resulting read-out current will indicate such concentration in the integral compartment. Consequently, the magnitude of the read-out current will be proportional to the charge transferred between the input and common electrodes and thus the solion will perform the desired integration function. The solion acts as a true integrator because the concentration of the measured species in the integral compartment remains constant when no signal is applied to the input and common electrodes. Therefore, no change occurs in the readout current as the readout current is dependent upon the concentration of the measured species.

Solion 14 is illustrated as comprising a cell containing an electrolyte in which there is immersed a common electrode 16, a read-out electrode 17, a shield electrode 18, and an input electrode 19. These electrodes are formed of a metal which is inert in the electrolyte. For example, platinum electrodes have been commonly used with an electrolyte formed of an aqueous solution containing a small amount of iodine and a comparatively large amount of potassium or sodium-iodide. This results in a solution containing a small amount of iodine and a compartively large amount of potassium or sodium-iodide. This results in a solution containing iodide-ions and tri-iodide ions, the latter of which will hereinafter be referred to as iodine. In such a redox system, iodine becomes the measured species of the ions of the solution.

Further information concerning the manner of construction or theory of operation of solion 14 is not felt to be necessary for a complete understanding of the invention. It suffices here to say that solion 14 will provide an output current which flows in the direction indicated by arrow 32 between read-out electrode 17 and common electrode 16 and is proportional to the integral of the current passed between input electrode 19 and common electrode 16 so that the read-out current remains at a level determined by the last applied input signal when the input signal is suddenly removed.

Amplifier 15, the output current of which traverses process load resistor 20, provides means for amplifying the read-out current of solion 14 so that process load currents of the desired magnitude can be supplied to the process load by integrator 10. As was previously indicated, the output of controller amplifier 12 is connected to the process load to generate a difference current which will be selectively applied to either the input of amplifier 12 or the input of integrator 10 in accordance with the position of transfer switch 11. When transfer switch 11 is in the illustrated "automatic" position, the input error signal appearing on conductor 30 will be applied through switch 11a to the input of controller 12. This will result in generating a controller output current 21, which is proportional to the signal upon conductor 30.

Assuming that process load current 22 is slightly smaller in magnitude than controller output current 21, the resulting difference current will flow into common electrode 16, through solion 14, and out through input electrode 19. Current flow in this direction will cause an increase in the read-out current flowing between read-out electrode 17 and common electrode 16 until read-out current 22 is equal to controller output current 21. When this condition arises, the difference current will be reduced to zero and no further change in read-out current will take place until controller output current 21 changes.

If, on the other hand, process load current 22 is larger in magnitude than controller output current 21, the different current applied to integrator 10 will be in the opposite direction and thus tend to decrease the read-out current until the condition of equality again exists.

Thus, it can be seen that when transfer switch 11 is in the automatic position process load current 22 will follow controller output current 21 which is in turn responsive to the error signal upon conductor 30. Thus, process load current 22 will be a function of the input error signal upon conductor 30.

When transfer switch 11 is operated to its manual position, the error signal on conductor 30 is disconnected from the input of amplifier 12 and the difference current output from the amplifier 12 is now applied through switch 11a to the amplifier's input. Switch 11b provides, when it is in its manual position, means to connect manual control 13 to the input of integrator 10 so as to permit manual control of the magnitude of load current 22. When the transfer from automatic to manual operation is made with the manual control switch 23 in the neutral position, the read-out current, and hence the process load current, will remain constant. When manual control switch 23, which is spring biased to return to its neutral position, is operated to its RAISE position, current is caused to pass into common electrode 16 to raise or increase the magnitude of load current 22 as long as it remains in its RAISE position. Operation of switch 23 to its LOWER position correspondingly serves to decrease process load current 22 as long as it remains in its operated position.

As is well known in the prior art, the electrochemical redox system of a solion must be completely reversible in order for it to accurately perform its integrating function. This will be obtained as long as the applied voltages stay below the potential at which other ions enter into the reaction at the electrodes. Furthermore, such reactions must be avoided to prevent the generation of a gaseous by-product, the pressure of which would destroy the cell. This requires the selection of proper bias voltages and the limiting of the magnitude of signal voltages applied to the solion.

The bias requirements of a solion are such as to require the shield and read-out electrodes to be negatively biased like amounts with respect to the input and common electrodes, respectively. Bias battery 24 thus provides means for negatively biasing shield electrode 18 with respect to input electrode 19. Means is also provided in the input circuit of amplifier 15 to fix the operating point of read-out electrode 17 so that it is negative with respect to common electrode 16 a corresponding amount. Bias voltages of .3 volt have been found to provide a proper bias for shield electrode 18 and a correct operating point for read-out electrode 17.

Manual control 13 is capable of selectively providing a voltage which does not exceed ±.6 volt thus preventing any undesirable reaction from taking place at these electrodes. Oppositely polarized diodes 25 and 26 provide means for limiting the magnitude of the voltage which can be applied across the input of solion 14 to ±.6 volt so that the solion will be protected from excessive signals which might be developed by the controller when in its automatic mode of operation.

To summarize then, bumpless transfer is accomplished in accordance with the invention by performing the mode transfer switching in the input circuit of the integrating device while the process load remains connected to its output. It will be understood that the process load will remain constant during the switching because the output of an electrical read-out integrator will remain constant as long as the current sources being switched in its input circuit are not generating current signals at the time of switching. This condition will be obtained during either transfer operation as long as switch 23 is in its unoperative condition at time of transfer, because under normal operating conditions the difference current will be zero since the system seeks to null the difference current in either mode of operation. Hence, when the system is switched from automatic to manual, the process load will be energized at a level determined by the controller amplifier immediately prior to switching and the process load will remain constant, so long as the manual control is not actuated, as a result of the characteristics of the solion 14. If, while in the manual position, the manual control switch 23 is actuated, the process load will be changed and this will be reflected back to the control amplifier 12 so that its output follows the process load. Therefore, when the transfer switching is returned to automatic, a bumpless transfer is again accomplished.

Therefore, the transfer function may be placed under the control of any automatic control device, there being no longer any necessity for manually balancing the control of signals when the modes of operation of the controller are changed.

While there has been described what is at present considered to be a preferred embodiment of the invention, it will be apparaent to those skilled in the art that various changes and modifications may be made therein without departing from the spirit or scope of the invention.

What we claim as new and desire to secure by Letters Patent of the United States is:

1. A system for synchronizing a controller which is capable of automatic and manual control to prevent the disruption of the controlled process when switching between its automatic and manual modes of operation comprising signal amplifying means,
   signal integrating means including means for providing an output signal which is proportional to the integral of a signal applied to the input of said signal integrating means,
   a process load electrically coupled to the output of said signal integrating means,
   a source of error signals,
   means for connecting said source of error signals to the input of said signal amplifying means,
   means for obtaining a signal which is equal to the difference between the output signals of said signal amplifying means and said signal integrating means and means for applying said difference signal to the input of said signal integrating means for equalizing the output signal of said signal integrating means with the output signal of said signal amplifying means whereby a signal equal to the output signal of said signal amplifying means will be applied to said process load by said signal integrating means.

2. A system for synchronizing a controller which is capable of automatic and manual control to prevent the disruption of the controlled process when switching between its automatic and manual modes of operation comprising signal amplifying means,
   signal integrating means including means for providing an output signal which is proportional to the integral of a signal applied to the input of said signal integrating means,
   a process load electrically coupled to the output of said signal integrating means,
   means for selectively providing a positive or a negative potential,
   means for connecting the selected potential to the input of said signal integrating means,
   means for obtaining a signal which is equal to the difference between the output signal of said signal amplifying means and the output signal of said signal integrating means and means for applying the resulting difference signal to the input of said signal amplifying means for equalizing the output signal of said signal amplifying means with the output signal of said signal integrating means.

3. A system for synchronizing a controller which is capable of automatic and manual control to prevent the disruption of the controlled process when switching between its automatic and manual modes of operation comprising signal amplifying means,
   signal integrating means including means for providing an output signal which is proportional to the integral of a signal applied to the input of said signal integrating means,
   a process load electrically coupled to the output of said signal integrating means,
   a source of error signals,
   means for selectively providing a positive or a negative potential,
   first and second switching means each of which is capable of assuming a first and a second condition,
   and means for obtaining a signal equal to the difference between the output signals of said signal amplifying means and said signal integrating means,
   said first switching means serving to apply, when said first switching means is in said first and second conditions, respectively, said error signals and said difference signals to the input of said signal amplifying means,
   said second switching means serving to apply, when in said first and second conditions, respectively, said difference signal and said selected potential to the input of said signal integrating means.

4. A system for synchronizing a controller which is capable of automatic and manual control to prevent the disruption of the controlled process when switching between its automatic and manual modes of operation comprising a controller amplifier,
   current integrating means including electrochemical means for providing an output current which is proportional to the integral of a current applied to the input of said current integrating means,
   a process load connected so that the output current of said current integrating means traverses said process load,
   a source of error signals,
   manually controllable means for selectively providing a positive or negative potential upon a conductor,
   first and second switching means each of which is capable of assuming a first and a second condition,
   and means for connecting the outputs of said current integrating means and said controller amplifier so as to generate a current equal to the difference between the controller amplifier output current and the process load current,
   said first switching means serving to apply, when in said first and second conditions, respectively, said error signals and said difference current to the input of said controller amplifier,
   said second switching means serving to apply, when in said first and second conditions, respectively, said difference current and the potential selectively provided upon said conductor to the input of said current integrating means.

5. A system for synchronizing a controller which is capable of automatic and manual control to prevent the disruption of the controlled process when switching between its automatic and manual modes of operation comprising a controller amplifier,
   current integrating means including electrochemical means for providing an output current which is proportional to the integral of the current applied to the input of said current integrating means,
   a process load connected so that the output current of said current integrating means traverses said process load,
   a source of error signals,
   a negative D.-C. potential source,
   a positive D.-C. potential source,
   a manually operable switch for selectively connecting said D.-C. potential sources to a conductor,
   first and second switching means each of which is capable of assuming a first and a second condition,
   and means for connecting the outputs of said current integrating means and said controller amplifier so as to generate a current equal to the difference between the controller amplifier output current and the process load current,
   said first switching means serving to apply, when in said first and second conditions, respectively, said error signals and said difference current to the input of said controller amplifier, said second switching means serving to apply, when in said first and second conditions, respectively, said difference current and the D.-C. potential upon said conductor to the input of said current integrating means.

6. The combination of claim 5 in which said current integrating means comprises an electrochemical cell having input, readout and common electrodes for providing a read-out current which is proportional to the integral of the current applied between said input and common electrodes, means connected in shunt with the input of said cell for limiting the magnitude of signals applied between its input and common electrodes, and means connected to the output of said cell for amplifying said readout current.

7. A system for synchronizing a controller which is capable of automatic and manual control to prevent the disruption of the controlled process when switching between its automatic and manual modes of operation comprising signal amplifying means for providing an output current proportional to signals applied to the input thereof, current integrating means including means for providing at an output terminal a current which is proportional to the integral of the current applied between an input terminal and a common terminal, a process load connected between said output and said input terminals, a source of error signals, means for connecting said source of error signals to the input of said signal amplifying means, and means for connecting the output of said signal amplifying means to the input of said current integrating means so that a current equal to the difference between the output currents of said signal amplifying means and said current integrating means will be applied to the input of said current integrating means.

8. A system for synchronizing a controller which is capable of automatic and manual control to prevent the disruption of the controlled process when switching between its automatic and manual modes of operation comprising signal amplifying means for providing an output current proportional to signals applied to the input thereof, current integrating means including means for providing at an output terminal a current which is proportional to the integral of the current applied between an input terminal and a common terminal, a process load connected between the output terminal of said current integrating means and the input of said signal amplifying means, means for selectively providing a positive or a negative potential, means for connecting the selected potential between said input and said common terminals of said current integrating means, and means for connecting the output of said signal amplifier to the input of said signal amplifier so that a current which is equal to the difference between the output current of said signal amplifier and the output current of said current integrating means will be applied to the input of said signal amplifying means.

9. A system for synchronizing a controller which is capable of automatic and manual control to prevent the disruption of the controlled process when switching between its automatic and manual modes of operation comprising signal amplifying means for providing an output current proportional to signals applied to the input thereof, current integrating means including means for providing at an output terminal a current which is proportional to the integral of the current applied between an input terminal and a common terminal, a process load, one terminal of which is connected to the output terminal of said current integrating means, a source of error signals, means for selectively providing a positive or a negative potential, first and second switching means each of which is capable of assuming a first and a second condition, and conductive means for connecting the other terminal of said process load to the output terminal of said signal amplifying means, said output terminals of said signal amplifying means and said current integrating means being of opposite polarity, said first switching means serving to connect, when in said first and second conditions, respectively, said error signal source and the point common to the output terminal of said signal amplifying means and the other terminal of said process load to the input of said signal amplifying means, said second switching means serving to connect, when in said first and second conditions, respectively, said common point and said selected potential to the input of said current integrating means.

References Cited by the Examiner

UNITED STATES PATENTS 3,246,250  4/1966  Nazareth _____ 330—10

JOHN W. HUCKERT, *Primary Examiner.*

J. D. KALLAM, *Assistant Examiner.*